INVENTORS
BERNATH L. KNECHT
BERNATH J. KNECHT

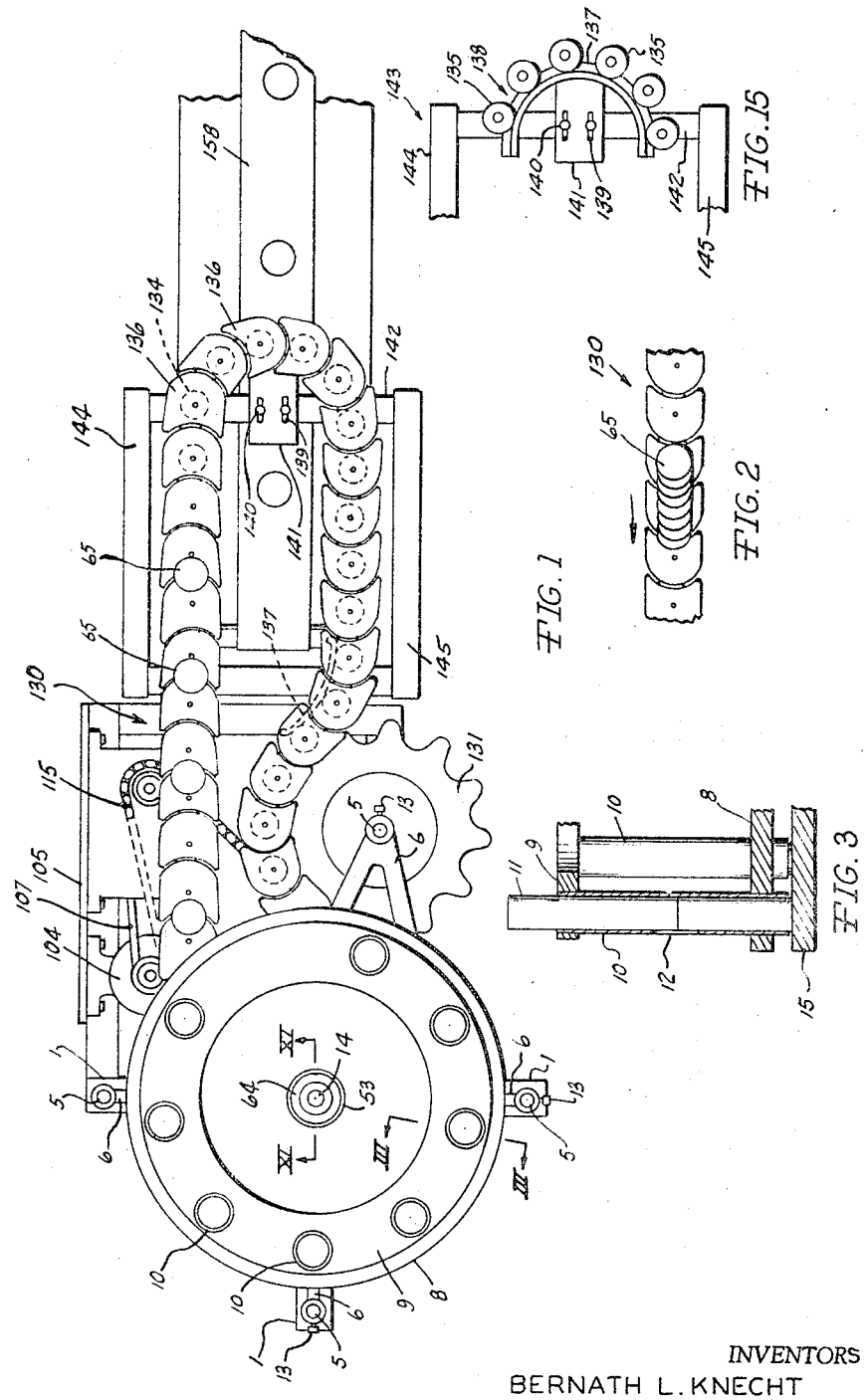

BY Roy A. Plant

ATTORNEY

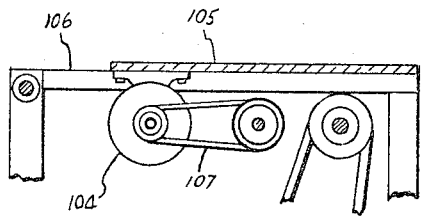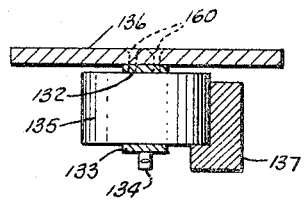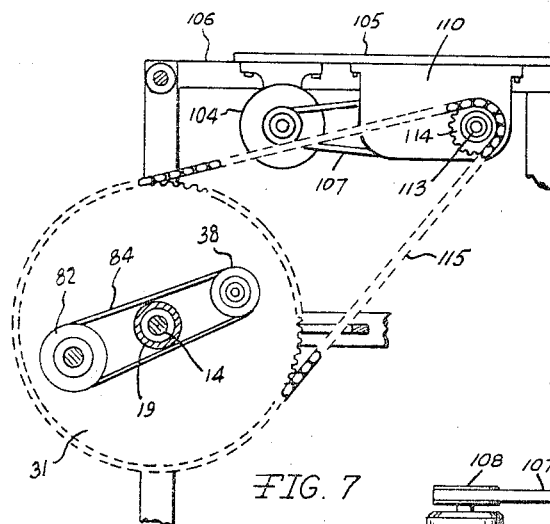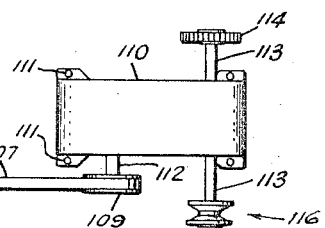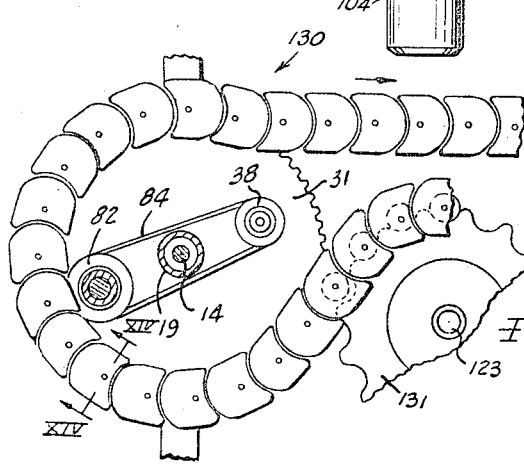

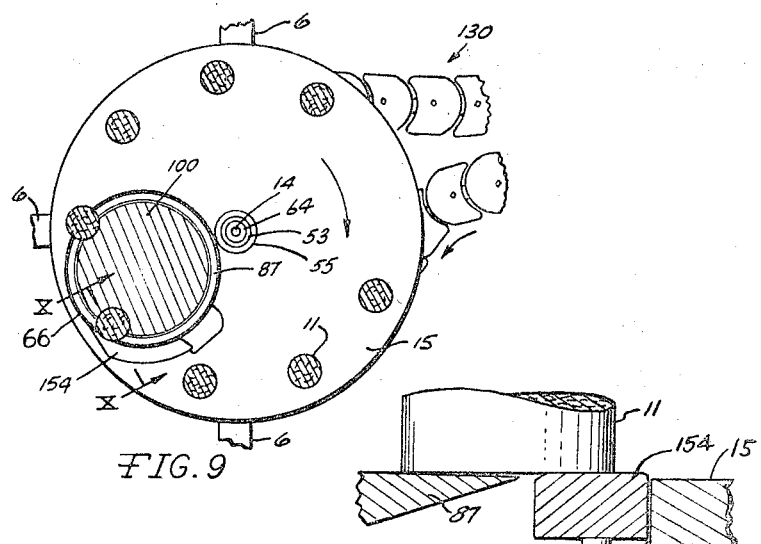
FIG. 9
FIG. 10
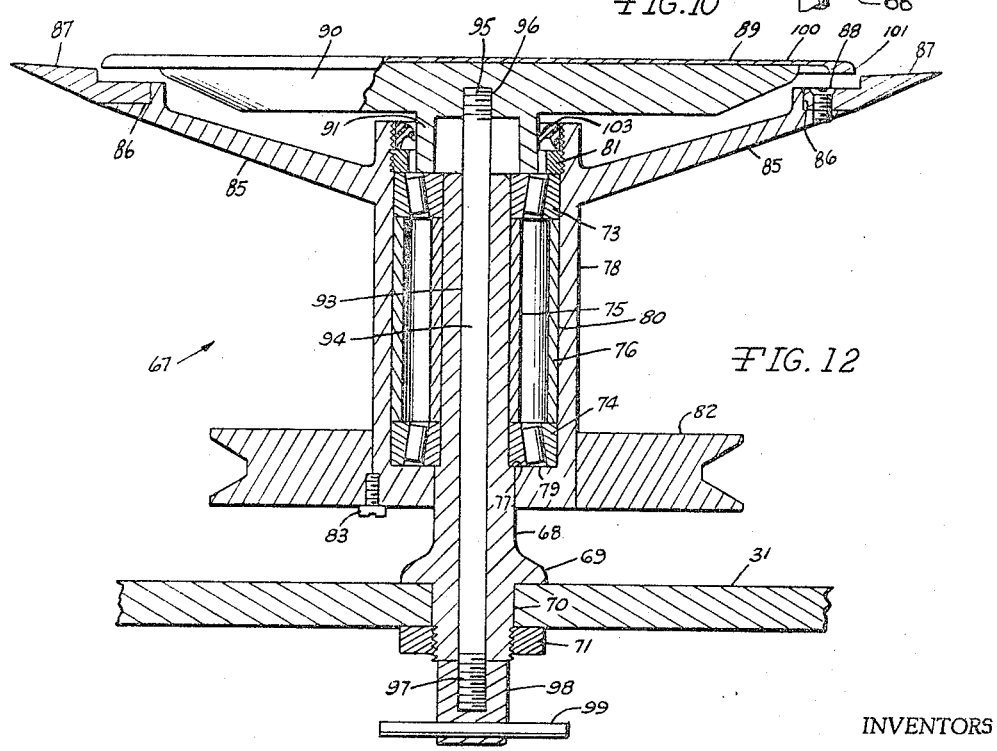
FIG. 12
INVENTORS
BERNATH L. KNECHT
BERNATH J. KNECHT
BY Roy A. Plant
ATTORNEY

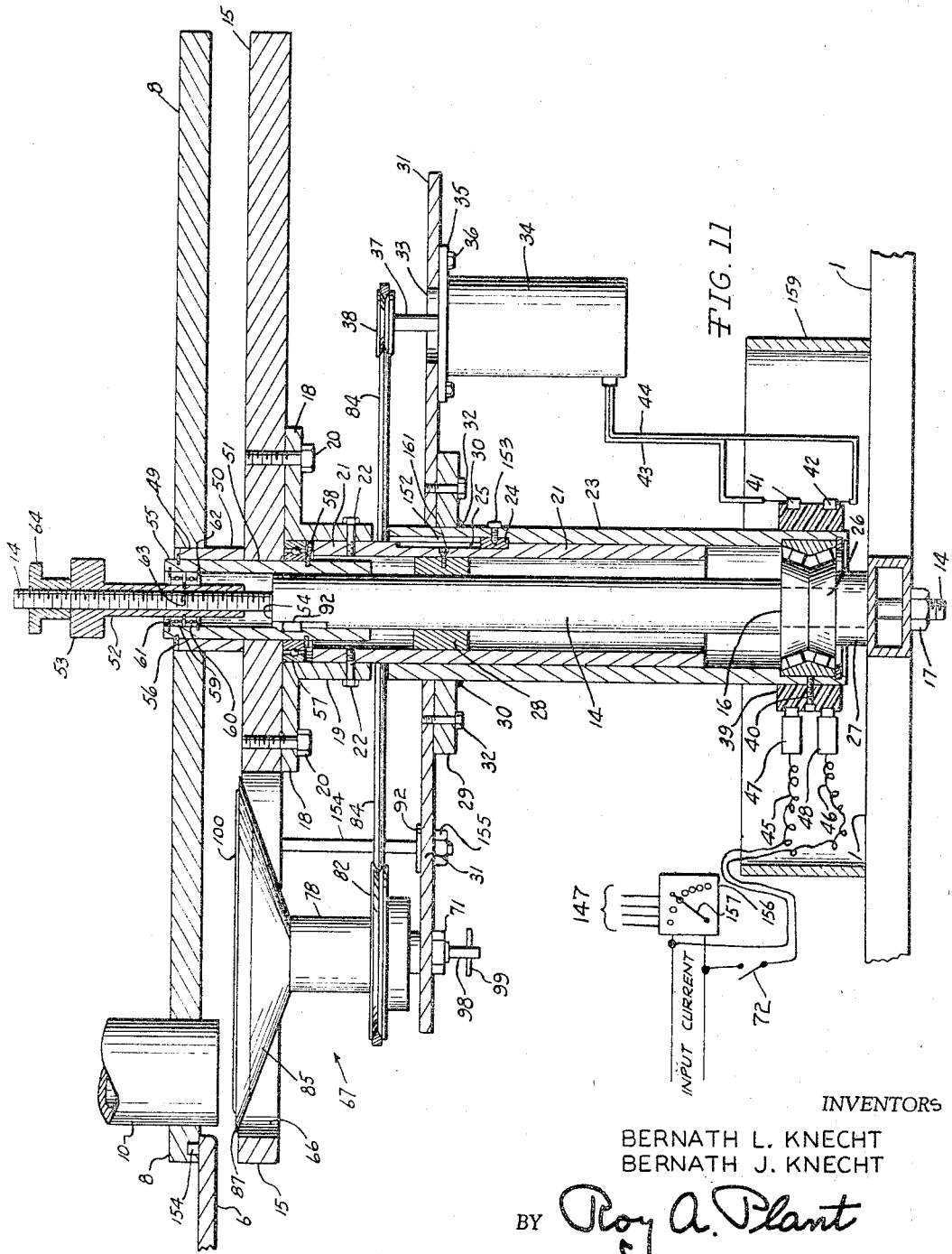

United States Patent Office 3,428,102
Patented Feb. 18, 1969

3,428,102
SLICING MACHINE WITH SLICE ARRANGER
Bernath L. Knecht and Bernath J. Knecht, Worthington, Ohio, assignors to Worthington Foods, Inc., Worthington, Ohio, a corporation of Ohio
Filed Oct. 13, 1965, Ser. No. 495,515
U.S. Cl. 146—101                                                        13 Claims
Int. Cl. A01d 55/00; B02c 13/00; B23d 45/22

ABSTRACT OF THE DISCLOSURE

This slicing machine not only slices foods, et cetera, of substantially rectangular or round section cylindrical form but also stacks the slices on a conveyor for transporting to a packaging point. The machine has a cage form of member holding the material to be sliced, and has a rotary disc which slidably supports the lower end of the material to be sliced. This disc has a hole through same in which is fitted a slicing knife assembly. An adjusting means is utilized to vary the thickness of the slices to be cut, so that a definite number of slices will weigh a prescribed amount ready for packaging and marketing. Said adjusting means being exposed so that adjustments can be made without stopping the machine. The slicing machine also has two motors with one rotating the cutting knife assembly and the other the separate disc which comes under the cage and is movable relative to the cutting assembly to vary the thickness of the slices. An adjusting means is used for moving said disc endwise at any time without stopping the machine to control the thickness of the slices, and a second adjusting means serves to vary the speed of the conveyor relative to the speed of rotation of the disc carrying the rotary slicing knife so that the slices may be stacked up coaxially on the conveyor or laid shingle pattern for display purposes.

The present invention relates broadly to a cutting and conveying assembly, and in its specific phases it relates to an apparatus for the slicing of multiple solid pieces of material and simultaneously conveying the individual slices from their slicing point to a point of packaging or use.

Slicing machines have commonly been provided with a stationary, motor driven, slicing knife wherein the material to be sliced is moved bodily across the fixed location knife with the sliced material falling in a single pile on a fixed receiver. These motor driven knife assemblies have also commonly been constructed with the fixed knife operating at an inclined angle. Commercial slicing machines are not available for high speed cutting and stacking a predetermined number of slices from stationary material while conveying the stacks of slices from the point of cutting to the point of packing. Also, no high speed commercial machine with fixed holders of material to be sliced was found which could be loaded and the slice thickness adjusted without stopping, while simultaneously forming several piles of slices for delivery at one point, and with adjustability to handle different size pieces to be sliced. It was a recognition that equipment of such available type was unsatisfactory for many purposes, and especially in the continuous commercially sliced food field, which led to the conception and development of the present invention.

Accordingly, among the objects of the present invention is the provision of a slicing machine with a conveying assembly for sliced solid foods and other materials wherein the item to be sliced feeds vertically from a stationary holder to a motor driven slicing knife traveling in a continuous orbit path above a moving conveyor onto which the sliced material falls as fast as it is cut.

Another object is to provide a slicing machine assembly having a multiplicity of upright hollow stationary members through which substantially cylindrical solid material to be sliced may be fed by gravity to a slicing means traveling in a continuous orbit path under said stationary member through which the material to be sliced is being fed.

Another object is to provide a rotary table under the lower ends of a multiplicity of upright hollow stationary members through which pieces of substantially cylindrical solid material to be sliced are passing, with said rotary table supporting the lower end of each of said pieces of substantially cylindrical solid material, and wherein said rotary table has a slicing knife projecting through the upper face of same an amount corresponding substantially with the thickness of the slice to be cut so that for each complete rotation of said table there is a slice cut from the lower end of each piece of said substantially cylindrical solid material supported thereon.

Another object of this invention is to provide the cutting assembly with means for adjusting the amount of projection of the slicing knife, over a suitable range, above the table carrying same so that all of the slices cut by the knife will be substantially of the same predetermined thickness, and with the amount of cutting knife projection being capable of adjustment without stopping the cutting assembly.

Another object is to provide the overall assembly with a conveyor directly adjacent and below the table supporting the ends of the multiplicity of pieces of solid material being sliced, said conveyor moving at a rate such that when it has completed its travel under the pieces of material being sliced and moves from in under same it will have such sliced material resting in piles with each pile having as many slices as there are ends of said material presented over the conveyor for slicing.

A further object is to provide the material slicing and conveying assembly with an adjusting means for varying the rate of travel of the sliced material receiving conveyor relative to the rate of travel of the slicing knife past the ends of the pieces of material to be sliced so that the slices can be either piled up substantially with a common axis, or they can be laid on each other in shingle pattern.

A further object is to provide a new type slicing machine wherein there is a rotary cutting blade which, in turn, extends through a cutting table which moves in a planetary orbit and supports the material being sliced.

Still further objects and advantages of this invention will appear as the description proceeds.

To the accomplishment of the foregoing and related ends, the invention, then, consists of the means hereinafter fully described and particularly pointed out in the claims, the annexed drawings and the following description setting forth in detail certain means of carrying out the invention, such means illustrating, however, but several of the various ways in which the principle of the invention may be used.

In the annexed drawings:

FIGURE 1 shows a top view of the slicing and conveying machine assembly of the present invention with the sliced product in coaxially stacked piles on the conveyor.

FIGURE 2 shows a fragmentary top view of a portion of the conveyor with a pile of the sliced product laying thereon in overlapping shingle pattern.

FIGURE 3 is a fragmentary and partially sectioned vertical view as taken at line III—III of FIGURE 1, looking in the direction of the arrows.

FIGURE 6 is a fragmentary sectional view as taken along line VI—VI of FIGURE 4, looking in the direction of the arrows.

FIGURE 7 is a fragmentary sectional view as taken along line VII—VII of FIGURE 4, looking in the direction of the arrows.

FIGURE 8 is a fragmentary sectional view as taken along line VIII—VIII of FIGURE 4, looking in the direction of the arrows.

FIGURE 9 is a fragmentary sectional view as taken along line IX—IX of FIGURE 4, looking in the direction of the arrows.

FIGURE 10 is a fragmentary sectional view showing the position of the cutting knife as it leaves the item from the end of which it has just cut a slice and as taken at line X—X of FIGURE 9, looking in the direction of the arrows.

FIGURE 11 is an enlarged fragmentary vertical sectional view of the slice thickness adjusting mechanism with some of the adjacent parts as taken at line XI—XI of FIGURE 1, looking in the direction of the arrows.

FIGURE 12 is an enlarged vertical center sectional view of the slicing knife and means for mounting same.

FIGURE 13 is a front elevational view of the gear box assembly and the motor drive for same, in the position shown in FIGURE 4.

FIGURE 14 is an enlarged fragmentary cross sectional view of the conveyor with its roller support guide as taken at line XIV—XIV of FIGURE 1, looking in the direction of the arrows.

FIGURE 15 shows a fragmentary top view of the adjustable conveyor guide and table at the right hand end of the conveyor as seen in FIGURE 1.

Figure 4:
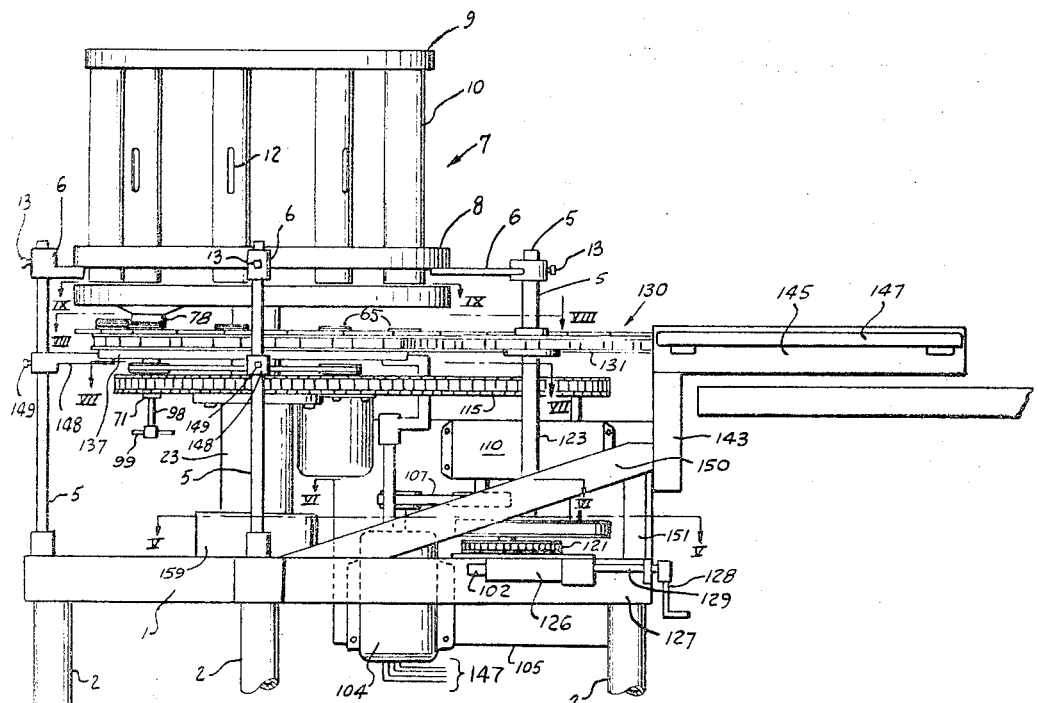
FIGURE 4 is a fragmentary side view of the slicing and conveying machine assembly of the present invention.

Referring more particularly to FIGURES 1 and 4 of the drawings, it will be noted that the overall assembly, including the slicing and conveying portions, is supported at the slicing end on a substantially horizontal X-shaped frame 1 conventionally mounted on four legs 2 preferably having bottom flanges 3, which, if desired may be fastened to the floor 4 to anchor the assembly in place. Mounted on frame 1 by means of four upwardly extending support columns 5 and conventionally adjustable brackets 6 is a cage unit assembly 7. One simple way of adjusting brackets 6 on columns 5 is by using set screws 13 threadedly fitting brackets 6 and engaging the side of column 5. This cage unit assembly has a bottom plate 8 and a top ring 9 with bottom plate 8 preferably being conventionally joined to brackets 6 by means of pins 154, FIGURE 11, extending upward from the ends of said brackets and fitting into corresponding sockets in the underface of said bottom plate 8 which makes rapid change of cages possible, although the fastening can also be accomplished by bolting, or the like, and it is intended that the drawings be considered as diagrammatically showing same.

Extending between bottom plate 8 and top ring 9 are a series of open ended hollow tubular members 10 of substantially straight and uniform inside size throughout for the free passage, preferably by gravity, of the solid material 11, FIGURE 3, to be sliced. Bottom plate 8 and top ring 9, as shown, are preferably provided with openings therethrough for the reception of said hollow tubular members 10, FIGURE 3, which facilitates welding or brazing the tubular members 10 to bottom plate 8 and top ring 9 to form a stable and rigid cage unit assembly 7 with the tubular members 10 extending a relatively uniform distance through bottom plate 8. These tubular members 10 may be provided with observation slits 12 so that the operator may observe whether it is time that further solid cylindrical material 11 to be cut should be dropped into the top of the corresponding tubular members 10.

A table support column 14, FIGURES 1 and 11, extends down to the center of the X-shaped frame 1 and is rigidly anchored to said frame as by passing through same with a shoulder 16 elevated above frame 1, as will be hereinafter described in detail, and a nut 17 threadedly engaging the lower end of said column 14 so that the latter will be held perpendicular to the bottom of cage unit assembly 7 and centered on same when said nut 17 is tightened to stabilize table support column 14 on said frame. Between shoulder 16 and frame 1 are mounted roller bearings 26, FIGURE 11, and if desired a spacer 27 may be placed between lower roller bearing 26 and frame 1. Rotatably, as well as endwise adjustably mounted on support column 14, as will be hereinafter set forth, is a table 15 which supports the lower end of the material 11 to be sliced, FIGURE 3. This table 15 is preferably in the form of a rigid round and flat horizontal plate, substantially perpendicular to table support column 14 as well as parallel to the bottom of cage unit assembly 7, and undercovering the bottoms of tubular members 10 through which the cylindrical material 11 to be sliced will pass.

Table 15, FIGURE 11, is mounted on the outurned flange 18 of a sleeve 19 and anchored to same in conventional manner, such as by means of cap screws 20. This sleeve 19, in turn, is anchored to a tubular member 21, for instance by means of cap screws 22. Tubular member 21 closely but slidably fits into a drive tube 23 which is provided with a key 24, the inner side of which engages a longitudinal slot 25 in tubular member 21 while its outer side fits in a short key way 152 in the inner surface of drive tube 23 with a screw 153 holding said key in place so that tube 21 will rotate in unison with drive tube 23 and yet can be moved vertically relative to same for a purpose to be hereinafter explained. A bronze bearing 28, or the like, conventionally carried by and anchored inside of tubular member 21 near the upper end of same, for instance by means of screw 161, contacts table support column 14 to stabilize tubular member 21 in its rotation around same.

Drive tube 23 is provided adjacent its upper end with a flange 29 which may be conventionally held in place as by means of a weld 30, FIGURE 11. Mounted on flange 29 and centered thereon is a large sprocket 31, which may be held in place by means of cap screws 32. This sprocket 31 is substantially parallel to table 15 and rotates in unison with same. Adjacent one edge of said sprocket 31, but spaced inwardly of same, is a perforation 33. Mounted on the underface of said sprocket 31 and centered below said perforation 33 is an electric motor 34, the end flange 35 of which is fastened to sprocket 31 as by means of cap screws 36. Shaft 37 of motor 34 passes up through perforation 33 and carries on its upper end, above sprocket 31, a V-pulley 38, the use of which will be hereinafter described.

Mounted on the ouside of drive tube 23, FIGURE 11, is an insulating ring 39 which may be fastened thereto in conventional manner such as by meanst of screws 40. This insulating ring has mounted on the outer face of same, in spaced apart relation, a pair of slip rings 41 and 42 concentric with table support column 14. Electric motor 34 is electrically connected in conventional manner to slip rings 41 and 42 by means of insulated wires 43 and 44. Electricity is supplied from the input current line by means of insulated wires 45 and 46 connected through brushes 47 and 48 to slip rings 41 and 42 in conventional manner. A switch 72 may be used to start and stop motor 34. Around the bottom of drive tube 23 there is preferably provided a housing 159 mounted on frame 1 to protect insulating ring 39 and the parts associated with same.

Bottom plate 8 of cage unit assembly 7 is held in fixed position on brackets 6 as shown in FIGURES 4 and 11, and yet to change the size or shape of the cylindrical material to be sliced, it is desirable to be able to remove the cage unit assembly 7 and substitute a different one having an appropriate size set of hollow tubular members 10 for the different size material to be sliced. To facilitate this, bottom plate 8, FIGURE 11, of cage unit assembly 7 is provided with a central perforation 49 which will rotatably fit tubular sleeve 50, which is preferably in the form of a bronze bearing, mounted centrally on table 15 with the bore of said bearing sleeve 50 being of approximately the same inside diameter as perforation 51 of table 15. The term "cylindrical" as used herein is intended to cover not only pieces of material 11 of round cross section but rather of any cross section sliceable in accordance with the principles of the present invention.

Again referring to FIGURE 11, it will be noted that the upper end of table support column 14 is of reduced size and threaded. Threadably fitting this upper portion of column 14 is an elongated internally threaded sleeve 52 having an enlarged, and preferably knurled edge, upper flange end 53 of a size small enough to pass through perforation 49 in bottom plate 8 of cage unit assembly 7 so as to facilitate changing of the cage unit assembly whenever desired to handle a different size or cross section material 11 without having to first remove threaded sleeve 52. The lower end of sleeve 52, under ordinary conditions of use, is spaced from shoulder 54 of table support column 14 as shown for a purpose to be hereinafter described.

A tubular sleeve 55, FIGURE 11, rotatably fits the bore of bearing sleeve 50 and table 15, while also being fastened by a key 92 to table support column 14 below its shoulder 54, to thus center and stabilize bottom plate 88 of cage unit assembly 7 relative to table 15 on said table support column 14, and at the same time allow table 15 to be moved up and down and rotated while protecting sleeve 52 from accidentally being moved out of adjustment. A snap ring 56 supports tubular sleeve 55 on the top of bearing sleeve 50 while directly under table 15 and encircling tubular sleeve 55 there is a ball thrust bearing 57 held in position by a second snap ring 58 engaging sleeve 55 which thus fastens table 15 to said tubular sleeve 55 for endwise movement in unison with same without interfering with the rotation of table 15 independent of sleeve 55. Inside of the upper end of tubular sleeve 55 are a pair of ball thrust bearings 59 and 60 which are held in place in said sleeve by means of upper and lower snap rings 61 and 62. Between thrust bearings 59 and 60 is a snap ring 63 engaging sleeve 52 which thus supports tubular sleeve 55 on internally threaded sleeve 52 which in turn threadably engages table support column 14. It is thus to be seen that by rotating sleeve 52 it will move table 15 up or down relative to bottom plate 8 of cage assembly 7, depending upon the direction of rotation, for a purpose to be hereinafter described. A lock nut 64 threadably engaging the upper end of table support column 14 above sleeve 52 is used, by tightening, to hold the assembly in place after same has been adjusted for cutting the desired thickness slices 65, FIGURES 3 and 4, of the material 11 to be sliced.

Table 15 is provided with a perforation 66, FIGURE 11, for the upper end of the slicing knife assembly 67 which will now be described. Mounted on sprocket 31 diametrically opposite to perforation 33 is a spindle 68, FIGURE 12, which extends through sprocket 31 with said spindle having a shoulder 69 resting on the upper side of said sprocket while said spindle extends through perforation 70 of the latter with a nut 71 anchoring said spindle to said sprocket. A counterbored sleeve 78 receives bearings 73 and 74 as well as spacers 75 and 76 with lower bearing 74 resting on shoulder 77 of spindle 68 and on shoulder 79 of sleeve 78. The upper end of the counterbore 80 of sleeve 78 is internally threaded and provided with an externally threaded ring nut 81 tightenable against the upper end of roller bearing 73 to firmly anchor roller bearings 73 and 74 in place in counter-bored sleeve 78. On the lower end of counterbored sleeve 78 is concentrically mounted in conventional manner, as by means of a screw-key 83, a V-belt pulley 82. A V-belt 84, FIGURES 7, 8 and 11, joins V-belt pulleys 38 and 82 so that operation of electric motor 34 will rotate counterbored sleeve 78 for a purpose to be hereinafter described.

At the opposite end of counter bored sleeve 78 from that carrying V-belt pulley 82, FIGURE 12, said sleeve is provided with an outwardly and upwardly inclined flange 85, the outer edge of which has a concentric shoulder 86 for centering and supporting circular cutting blade 87 which is anchored to flange 85 is conventional manner, such as by means of screws 88. This blade 87 extends up through perforation 66 in table 15 as shown in FIGURE 11, with the amount of projection of the cutting edge of blade 87 above the top of table 15 determining the thickness of the slices 65 of the material 11 to be sliced.

In order to facilitate carrying the main body of the material 11, from which a slice 65 is being cut, across the central portion of circular cutting blade 87, a slide disc 89, FIGURE 12, is provided. This slide disc 89 has a rigid body member 90 with a downwardly extending central hub 91 which rests on the top of bearing 73 to further hold same in place as will now be described. Spindle 68 is provided with a central bore 93 for the free reception of a rod 94 which is threaded on both ends. The upper threaded end 95 of rod 94 engages internal threads in socket 96 of body member 90 and is tightly joined to same while the lower threaded end 97 is engaged by a nut 98 which may be provided with a T-handle 99 for quick tightening or removal of slide disc 89, with said tightening holding slide disc 89 fixed on the upper end of spindle 68. Rigid body member 90 is preferably provided with a moderately thin cap member 100 conventionally anchored to same, as by spot welding, with said cap member extending substantially to the inner shoulder of circular cutting blade 87. This cap member has a turned down edge 101 so that the end of the material 11 will easily pass up onto cap member 100, which is preferably slightly higher than the top edge of said circular cutting blade 87, as the slicing progresses. At the outer edge of the circular cutting blade, as shown in FIGURES 9 and 10, at the trailing edge of perforation 66 there is mounted on table 15 a fixed height shoe member 154 which, in use, is suitably higher than the top of cutting knife 87 for a purpose to be hereinafter described in detail. This shoe member 154, FIGURE 11, has a shoulder 92 which rests on the top of large sprocket 31 through which it passes and is anchored by means of nut 155.

If desired, a thin edged rubber gasket 103, FIGURE 12, may be placed in the upper end of the bore of sleeve 78 and in contact with the central hub 91 of slide disc 89 to keep any liquid, food particles, or the like out of roller bearings 73 and 74 which might be injured by same. It should be noted that by removing nut 98 this not only permits removing slide disc 89 and rod 94 but also sleeve 78 and the various parts associated with same to thus facilitate cleaning same and the sharpening of blade 87.

The operation of the slicing machine is such that table 15, FIGURE 11, is raisable and lowerable relative to the bottom plate 8 of cage unit assembly 7 merely by loosening lock nut 64 and rotating sleeve 52, and since table 15 supports the lower ends of the pieces of material 11 to be sliced, FIGURE 3, this varies the extent to which the material to be sliced extends out of the bottom of hollow tubular members 10. With this in mind, it is also to be noted that the slicing knife assembly 67, FIGURE 11, is fixed against endwise movement since it is mounted on large sprocket 31 which is rotatably supported in substantially fixed position on drive tube 23. Such being the case, any adjustment of sleeve 52 either up or down will raise or lower, as the case may be, table 15, and since the slicing knife assembly 67 is vertically fixed, the amount that table 15 moves up or down will vary to that extent the thickness of the slices of material 11 being cut. It is also to be noted that this adjustment can be made even while the slicing machine is running, a thing which is impossible with current-day commercial slicing machines, so far as all of those examined are concerned. This adjustability is important and a time saver, since, for instance, when slices of food are being packed for sale there will be a predetermined number of slices in the package which will be of a predetermined weight. Thus, with the machine running the beginning slices in the number to be packed are check weighed and sleeve 52 adjusted until the desired slice thickness and weight is attained, followed by tightening lock nut 64 to hold the adjustment, without having to stop the machine. Rechecking the weight from time to time can be readily done and adjustments made without stopping the machine, where necessary, to keep the weight at the desired point.

Rotation of table 15 is accomplished through electric motor 104, FIGURES 4, 5, 6 and 7, mounted on support plate 105 which is bolted or otherwise fastened on a side rail 106 of frame 1. This motor, in turn, is connected by means of a V-belt 107, FIGURE 13, through the V-belt pulley 108 on motor 104, to the V-belt pulley 109 on gear box 110. This gear box is also mounted on support plate 105 in conventional manner such as by cap screws 111. V-belt pulley 109 is mounted on a shaft 112 of gear box 110 for delivery of power to the gear box 110 for transmission through same in conventional manner to output shaft 113 which extends out of gear box 110 on both sides of same. The upper end of output shaft 113 is provided with a drive sprocket 114 for driving chain 115, FIGURE 7, which in turn passes around large sprocket 31 which is connected to and rotates table 15 as previously described.

Figure 5:
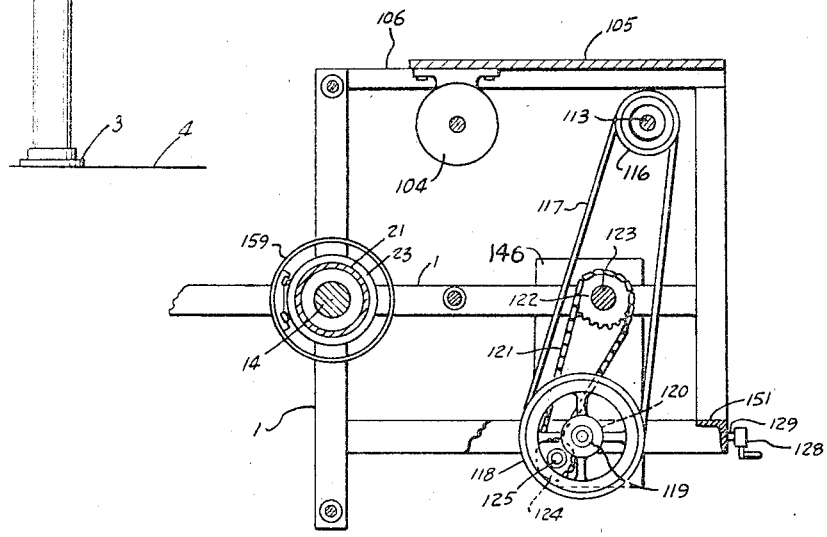
FIGURE 5 is a fragmentary sectional view as taken along line V—V of FIGURE 4, looking in the direction of the arrows.

The lower end of output shaft 113, FIGURE 13, is provided with a spring loaded variable pitch pulley 116 receiving one end of V-belt 117, FIGURE 5, while the other end of this V-belt 117 passes around V-belt pulley 118 mounted on shaft 119 which in turn has conventionally anchored to same, for instance by a key (not shown), for rotation in unison therewith of a sprocket 120 engaging chain 121, one end of which passes around sprocket 122 mounted on and conventionally fastened to shaft 123 for rotation in unison with same. The other end of chain 121 passes around sprocket 124 mounted on shaft 125. Shafts 119 and 125 are mounted on a plate 146 which is pivotally mounted on shaft 123. Carrier 126, FIGURE 4, slidably mounted on frame side rail 127 in conventional manner, such as on ways 102, engages plate 146 in conventional manner, such as by a pin and slot connection (not shown), so that rotating crank 128 in either direction will, through crank shaft 129, move carrier 126 and plate 146 in corresponding direction.

Now referring to FIGURE 5, it will be noted that moving carrier 126 to the left will increase the distance between pulleys 116 and 118. This in turn tightens the pull of V-belt 117 on the spring loaded variable pitch pulley 116 and spreads same endwise to decrease the pitch diameter of pulley 116 which, in turn, reduces the speed of rotation of pulley 118 relative to pulley 116. This varies the speed of travel of conveyor 130 relative to the rate of rotation of table 15 to control whether the sliced material will be laid in coaxial piles or in shingle pattern, FIGURE 2, as will be hereinafter explained in detail.

Conveyor 130, FIGURE 1, is driven by a sprocket 131 which is mounted on shaft 123, FIGURES 4 and 5, for rotation in unison therewith. This conveyor is preferably of the general type marketed by Link-Belt under the trademark name of "Crescent" flat-top chains, and which have links 132 and 133, FIGURE 14, conventionally pivoted at their ends on pins 134 each of which, in turn, carry roller 135 of a size and spacing to fit sprocket 131. Top link 132 has mounted thereon a top-plate 136, preferably by rivets 160, with each of said top-plates nesting edgewise with the adjacent top-plates so that the conveyor can follow a tortuous path as shown in FIGURE 1 while always presenting a flat top surface to receive the slices 65, as shown. The conveyor 130, except where same is supported and carried by sprocket 131, is guided and supported on a guide member 137, FIGURE 14, with rollers 135 of the conveyor engaging same as shown. A curved tightener member 138, FIGURES 1 and 15, preferably shaped in cross section like guide member 137, FIGURE 14, is provided at the right-hand end of the assembly, as shown in FIGURE 15, so that the conveyor can be initially tightened and any looseness due to wear in use can be taken up as needed. The mounting of this curved tightener member 138 is preferably of conventional well-known construction, utilizing slots 139 and anchoring cap screws 140 or bolts. These slots 139 are in an extending member 141 of tightener member 138 resting on cross bar 142 of table 143 having upper side members 144 and 145. Cap screws 140 pass through slots 139 and adjustably anchor the curved tightener member 138 to said cross bar.

The conveyor guide member 137, FIGURE 4, in the general area below the cage 7, is conventionally supported on brackets 148 adjustably mounted on support column 5 and anchored in place with set screws 149 so that the conveyor 130 can be adjusted to travel in a predetermined plane through the area where it receives the slices 65, then over table 143, and around adjustable chain guide 137 of tightener member 138 at the outer end of said table. In preferred construction the conveyor 130 is slightly inclined in the slice receiving area so as to keep the top of the growing piles of slices 65 approximately the same distance below the cutting edge of the knife to facilitate uniform stacking of said slices.

Table 143 is preferably rigidly anchored to frame 1, FIGURE 4, for stability of the overall assembly, and one way to accomplish this is to join both sides of the table 143 to frame 1 by means of brace members 150 having a supporting leg 151, all of which can be welded or brazed together, as diagrammatically indicated, if dismountability through the use of bolts or cap screws is not desired.

Now referring to FIGURES 9 and 10, it will be noted that at the trailing edge of perforation 66 in table 15 there is provided a support shoe 154, which is fixed in height relative to circular cutting blade 87 due to being mounted on large sprocket 31 along with slicing knife assembly 67. Under conditions of slicing operation the support shoe is preferably just slightly higher than the cutting edge of blade 87. Thus, when the leading edge of blade 87 has cut a slice 65 from the end of the material 11 to be sliced, the cut end slides across fixed location cap member 100 in the center of blade 87 and then across the trailing edge of said blade and onto support shoe 154 which then holds the cut end of said material from further contact with said blade as it leaves same. This prevents undesirable scoring or marking of this cut face which would detract from its appearance in the succeeding slice cut from same.

The operation of the slicing and conveying assembly is as follows: With the tubular members 10 of cage 7, FIGURE 4, filled with material 11 to be sliced, FIGURE 3, and with the slicing knife assembly 67, FIGURE 11, adjusted to cut the approximate thickness slices 65 desired, the control lever 157 of D.C. voltage converter and controller 156 is moved so as to deliver starting operating current through insulated wires 147 to motor 104, FIGURE 4. Conveyor 130 will then start traveling along its path and under rotating table 15 through perforation 66 of which extends the rotating upwardly projecting slicing knife 87. With the conveyor 130 traveling at a speed such that it will move a distance equal to the center-to-center spacing between tubular members 10 for each complete revolution of table 14, the slices 65 will stack up in coaxial piles on the conveyor 130. If it is desired to lay the slices on the conveyor in shingle pattern, FIGURE 2, hand crank 128, FIGURE 4, can be turned to vary the linear speed of the conveyor from the rotary speed of rotating table 15. For instance, if the conveyor is speeded up a little relative to the table 15 the shingle pattern of slices 65 will be as shown in FIGURE 2. Referring again to FIGURES 1 and 11, it is to be noted that tubes 10 of cage assembly 7 are adjacent the outer edge of ring 8 so that the outer edge of blade 87 does the slicing with the slices 65 dropping unobstructed onto conveyor 130 adjacent the outer edge of table 15 and spaced outwardly from the rotative path of sleeve 78.

If, for instance, piles of eight slices are wanted, the table 15 will have made eight complete revolutions while the conveyor is traveling from the first to the eighth piece of material 11 to be sliced, and for which the specific machine illustrated is made with its eight equally spaced tubes, and with a double space between the eighth and first tubes to accommodate the limitations of the conveyor which can only undercover eight of the nine equal spaces for which table 15 is laid out. While the drawings illustrate the use of tubes for the slicing of a maximum of eight slices to a pile, the invention is not limited to the cutting of eight slices, but rather less slices can be cut than eight with the same machine by placing material 11 to be sliced in a lesser number of tubular members 10, and by using a greater number of tubes 10 filled with material to be sliced, and readjusting the linear speed of the conveyor appropriately to the rotative speed of table 15 other numbers of slices per pile can be cut, and it is intended that the showing in the drawings be considered as diagrammatic of these various constructions which also use the method of this invention.

It is to be noted that the packaged product is sold by weight in most instances, such as is the case with food, and accordingly, the pile of eight slices, or other desired number of slices, are weighed to determine whether they have the desired weight. If they do not, then lock nut 64, FIGURE 11, is loosened and sleeve 52 through its flange end 53 is rotated to correspondingly raise or lower table 15 which varies the thickness of the slices with weight checking being continued until the desired weight is attained, following which lock nut 64 is tightened to hold the adjustment. This can be done without stopping the machine, and after the proper weight has been attained the D.C. converter and controller 156 can be adjusted to attain the desired speed of operation.

Under actual operating conditions two packers facing each other from opposite sides of table 143 take the piles of slices 65 from the conveyor 130 and place them, for instance, in single (or multiple) piles, FIGURE 1, with a suitable space between said piles, on a strip of "Cellophane" or the like 158 which passes between and below runs of the conveyor 130 in the area between side members 144 and 145, and travels to the right where a packaging machine (not shown) folds, seals, and cuts the "Cellophane" so as to provide finished packages of the sliced goods. If desired, shelves (not shown) could be provided on opposite sides of side members 144 and 145 to serve as temporary storage points for defective piles of sliced goods as well as for regular piles of goods when the slicing of goods temporarily exceeds the packaging rate.

While but one form of the apparatus of the present invention has been shown and described along with the method involved, other forms within the spirit and scope of the invention will now be apparent to those skilled in the art. Therefore, the embodiment shown in the drawings as well as the method described are to be considered as being merely set forth for illustrative purposes, and are not intended to limit the spirt and scope of the invention herein described and shown.

Other modes of applying the principles of our invention may be employed instead of those explained, change being made as regards the means herein disclosed, provided those stated by any of the following claims or their equivalent be employed.

We therefore particularly point out and distinctly claim as our invention:

1. A slicing assembly of the character described for slicing solid material of readily sliceable type and of suitable size and shape which comprises:
    (a) a frame
    (b) a cage having multiple spaced apart tubular members in a circular path for receiving and gravity feeding said readily sliceable solid material to slicing position,
    (c) a rotary table directly below, substantially parallel to, and spaced a short distance from the bottom of said tubular members of said cage,
    (d) a first electric motor, means for connecting said first motor to said table for rotating same,
    (e) said table slidably supporting the lower end of said readily sliceable solid material received and guided by said tubular members of said cage for slicing, said rotary table having an opening through same in position to pass under the lower end of said tubular members carrying said solid material to be sliced as said table rotates substantially concentric of and under said cage,
    (f) a slicing knife assembly including a rotary knife,
    (g) means for rotatably supporting said slicing knife assembly,
    (h) a second electric motor mounted on said last named means,
    (i) means operably connecting said motor to said slicing knife assembly for rotating said rotary knife, the rotary knife of said slicing knife assembly being adjacent said opening in said table and projecting above the top of the latter in position to slice said readily sliceable solid material when said slicing knife assembly is rotated in cutting direction along with said rotary table under said cage with the slices passing through said opening as said table is rotated,
    (j) means for adjusting the extent to which the rotary knife of said slicing knife assembly projects above said table opening,
    (k) moving carrier means located below positions of said tubular members for receiving and transporting said sliced solid material as said table and slicing knife assembly are rotated in unison under said cage,
    (l) means for mounting various items including said cage, rotary table, an slicing knife assembly and its carrier in cooperative positions on said frame.

2. A slicing asembly as set forth in claim 1, wherein said tubular members being open at both ends, and a plate adjacent the bottom of said tubular members holds them rigidly in substantially parallel position with most of said tubes equally spaced from each other and in a circular path directly over the circular path travelled by said slicing knife when said table is rotated.

3. A slicing assembly as set forth in claim 1, wherein said means rotatably supporting said slicing knife assembly is in the form of a separate rotary disc carrier for said slicing knife assembly, means for mounting and supporting said rotary disc carrier and said table for rotation in unison, and said means for adjusting the extent to which the knife of said slicing knife assembly projects above said table opening being in the form of means connected to said table for raising and lowering same relative to said rotary knife.

4. A slicing assembly as set forth in claim 3 wherein said slicing knife assembly includes a supporting slide means on said rotary knife for the solid material to be sliced by same, means for mounting said slicing knife assembly in fixed position on said rotary disc carrier, said second electric motor depending from said rotary disc carrier of said slicing knife assembly, means for mounting same on said carrier, and means connecting said electric motor to said slicing knife assembly for rotating said knife independent of the rotation of said carrier and table.

5. A slicing assembly as set forth in claim 2, wherein there is a rotary disc carrier for said slicing knife assembly, means for mounting said rotary disc carrier and said table for rotation in unison, and said means for adjusting the extent to which the knife of said slicing knife assembly projects above said table opening being in the form of means extending through said plate holding the bottom of the tubes of said cage and connected to said table for raising and lowering same relative to said knife.

6. A slicing assembly as set forth in claim 5, wherein said means connected to said table for raising and lowering same relative to said knife includes a central table support column the upper end of which is threaded, a threaded member in engagement with said threads on said table support column, means connecting said threaded member to said table for raising and lowering the latter in step with the corresponding direction of rotation of said threaded member, and means facilitating the rotation of said threaded member at any time said table is to be adjusted to vary the thickness of the slice to be cut.

7. A slicing assembly as set forth in claim 1, wherein said means for connecting said motor to said table for rotating same includes a gear box having input and output connections, means rotatably connecting said motor to the input connection of said gear box, means rotatably connecting the output connection of said gear box to said rotary disc carrier means for rotatably supporting said slicing knife assembly, and means connecting said rotary disc carrier means for rotatably supporting said slicing knife assembly to said rotary table for rotation in unison therewith.

8. A slicing assembly as set forth in claim 7, wherein said means for rotatably connecting the output connection of said gear box to said means for rotatably supporting said slicing knife assembly is in the form of a large sprocket, said output connection of said gear box is a sprocket, a chain operably connecting said sprockets, a drive tube, means rotatably supporting said drive tube on said frame, and means fixedly anchoring said drive tube to said large sprocket for rotation in unison therewith.

9. A slicing assembly as set forth in claim 8, wherein said rotary table is mounted on a tubular member telescopically fitting into said drive tube, key means connecting said tubular member to said drive tube for rotation in unison therewith while permitting said tubular member to be moved endwise relative to said drive tube thus varying the extent to which the knife of said slicing knife assembly projects through said table so as to control the thickness of the slice to be cut from said solid material to be sliced.

10. A slicing assembly of the character described for slicing solid material of readily sliceable type and of suitable size and shape which comprises a frame, a cage for receiving and guiding said readily sliceable solid material to slicing position, a rotary table directly below, substantially parallel to, and spaced a short distance from the bottom of said cage, an electric motor, means for connecting said motor to said table for rotating same, said table slidably supporting the lower end of said readily sliceable solid material received and guided by said cage for slicing, said rotary table having an opening through same in position to pass under the lower end of said solid material to be sliced as said table rotates substantially concentric of and under said cage, a slicing knife assembly, means for rotatably supporting said slicing knife assembly, said slicing knife assembly having a knife adjacent said opening in said table and projecting above the top of the latter in position to slice said readily sliceable solid material when said slicing knife assembly is rotated in cutting direction under said cage with the slices passing through said opening as said table is rotated, means for adjusting the extent to which the knife of said slicing knife assembly projects above said table opening, means for receiving said sliced solid material as said table and slicing knife assembly are rotated in unison under said cage, and means for mounting various items including said cage, rotary table, and slicing knife assembly in cooperative positions on said frame, wherein said means for receiving said sliced solid material as said table and slicing knife assembly are rotated in unison under said cage includes a conveyor, means for supporting and guiding said conveyor substantially throughout its travel and particularly directly under said table and adjacent the outer edge of same so as to follow a path directly below said solid material being sliced, means for taking up slack in said conveyor, a sprocket for driving said conveyor, means connecting said table rotating motor to said conveyor driving sprocket for moving said conveyor so as to receive said sliced solid material in piles, said conveyor moving substantially a distance from center to center of the adjacent pieces of material being sliced while said table makes a complete revolution.

11. A slicing assembly as set forth in claim 10, wherein said means connecting said table rotating motor to said conveyor driving sprocket includes means for varying the speed of travel of said conveyor relative to the speed of rotation of said table, whereby the delivery of the slices onto said conveyor may be varied from substantially coaxial piles to shingle laid piles.

12. A slicing assembly as set forth in claim 11, wherein there is a separate rotary carrier for said slicing knife assembly, means for mounting said carrier and said table for rotation in unison, and said means for adjusting the extent to which the knife of said slicing knife assembly projects above said table opening being in the form of means connected to said table for raising and lowering same relative to said knife.

13. A slicing assembly as set forth in claim 12, wherein said slicing knife assembly includes a rotary knife, means for mounting said slicing knife assembly in fixed position on said rotary carrier, an electric motor, means for mounting same on said rotary carrier, and means connecting said electric motor to said slicing knife assembly for rotating said knife independent of said rotation of said carrier and table.

References Cited

UNITED STATES PATENTS

| | | | |
|---|---|---|---|
| 2,166,648 | 7/1939 | Swofford | 146—105 X |
| 2,414,152 | 1/1947 | Jackson | 146—94 |
| 3,161,215 | 12/1964 | Werder et al. | 146—94 |
| 3,194,289 | 7/1965 | Lundell | 146—105 |

W. GRAYDON ABERCROMBIE, *Primary Examiner.*

U.S. Cl. X.R.

146—94